(12) United States Patent
Rapp

(10) Patent No.: US 7,379,234 B2
(45) Date of Patent: May 27, 2008

(54) QUALITY MONITORING OF AN OPTICAL FIBER AMPLIFIER

(75) Inventor: Lutz Rapp, Deisenhofen (DE)

(73) Assignee: Siemens Aktiengesellschaft, Munich (DE)

(*) Notice: Subject to any disclaimer, the term of this patent is extended or adjusted under 35 U.S.C. 154(b) by 75 days.

(21) Appl. No.: 11/239,410

(22) Filed: Sep. 29, 2005

(65) Prior Publication Data

US 2006/0250679 A1   Nov. 9, 2006

(30) Foreign Application Priority Data

Sep. 30, 2004   (DE) ............... 10 2004 047 623

(51) Int. Cl.
*H01S 3/00* (2006.01)
(52) U.S. Cl. .................. 359/337; 359/341.3
(58) Field of Classification Search ......... 359/333, 359/337, 341.3
See application file for complete search history.

(56) References Cited

U.S. PATENT DOCUMENTS

| 5,440,418 | A | 8/1995 | Ishimura et al. |
| 6,583,926 | B1 * | 6/2003 | Wu et al. ............... 359/341.4 |
| 7,006,282 | B2 * | 2/2006 | Tian et al. ............. 359/341.41 |
| 7,079,312 | B2 * | 7/2006 | Koch et al. ............. 359/341.3 |

FOREIGN PATENT DOCUMENTS

| DE | 697 20 200 T2 | 1/1997 |
| EP | 1 193 893 A1 | 4/2002 |
| EP | 1 349 299 A1 | 10/2003 |
| WO | WO 2005/057813 A1 * | 6/2005 |

OTHER PUBLICATIONS

E. Desurvire, D. Bayart, B. Desthieux and S. Bigo, Erbium-Doped Fiber Amplifiers, "Device and System Developments", BOOK, John Wiley, New York, 2002, pp. 11-61.
A.A.M. Saleh, R.M. Jopson, J.D. Evankow and J. Aspell, "Modeling of gain in erbium-doped fiber amplifiers", IEEE Photonics Technology Letter, vol. 2, 1990, pp. 714-717, Abstract.

* cited by examiner

*Primary Examiner*—Mark Hellner
(74) *Attorney, Agent, or Firm*—Bell, Boyd & Lloyd LLP

(57) ABSTRACT

A method is described for detecting aging effects in components of an optical fiber amplifier wherein a broadband signal is amplified by means of a pump source in conjunction with at least one amplifying fiber. Input and output powers or, as the case may be, photon flows are determined at the input of the first amplifying fiber and at the output of the last amplifying fiber. Photon balancing from which an effective pump power of the pump source is calculated taking account of the characteristics of components of the optical amplifier at the beginning of life is calculated is carried out using the input and output powers or, as the case may be, photon flows in the case of a present operating status. Conclusions can be drawn about the aging of components in the optical fiber amplifier depending on the nature of the difference between the current and effective pump powers. An associated monitoring device is presented for implementing the method according to the invention.

23 Claims, 3 Drawing Sheets

QUALITY MONITORING OF AN OPTICAL FIBER AMPLIFIER

CROSS REFERENCE TO RELATED APPLICATIONS

This application claims priority to the German application No. 10 2004 047 623.3, filed Sep. 30, 2004 and which is incorporated by reference herein in its entirety.

FIELD OF INVENTION

The invention relates to a method, a monitoring device, and a data carrier for detecting aging effects in components of an optical fiber amplifier.

SUMMARY OF THE INVENTION

Erbium-doped fiber amplifiers (EDFA) are subject to various aging mechanisms that can lead to a deterioration in system performance and ultimately even cause a transmission system to fail. To minimize downtimes and the loss of revenue associated therewith it is very important to permanently monitor the quality of the amplifiers employed in a system and, where applicable, to generate an alarm so that an aged component can be promptly replaced.

Methods employed hitherto only monitor the pump lasers used for a fiber amplifier and frequently just their chips. Modern amplifiers preferably use a pump source that operates at a wavelength of 980 nm and whose reliability has been substantially improved so that outages sustained by other—for example passive—components are becoming more significant.

FIG. 1 shows the typical structure of an amplifier stage for a two-stage fiber amplifier, for example for amplifying an incoming WDM (Wavelength Division Multiplex) signal S, consisting of power-measuring means M_IN, M_OUT at the input and output of the amplifier stage and a pump source PQ (pump laser) whose pump signals are fed by means of a coupler CPL into an erbium-doped fiber EDF (generally an amplifying fiber) connected intermediately between the power-measuring means M_IN, M_OUT. Connected between the input of the optical fiber amplifier and the coupler CPL is a first isolator ISO1 and at the output of the erbium-doped fiber EDF1 a second isolator ISO2. The undesired coupling into the erbium-doped fiber EDF of spectral components due, for instance, to back reflections of a pump beam is suppressed by means of the isolators ISO1, ISO2. A gain-smoothing filter F is connected downstream of the second isolator ISO2 so that signal powers of several channels of a WDM signal are equalized for example at the output of the optical fiber amplifier or, as the case may be, so that a desired tilting of the output spectrum is set.

Amplifier outages being mainly ascribable to the pump sources, or pumps, methods were developed for monitoring these. Pumps routinely each have a pump diode that is integrated in a pump module and as a rule located on the side of the laser chip opposite the fiber coupling. In this case it is referred to also as a back facet monitor diode. For monitoring, the current required in order to achieve the nominal power is compared with the corresponding value at the time the photodiode starts operating. An alarm will be sent if the differences then arising exceed a specific value.

The above solution has serious shortcomings, however. For one thing the monitor diode integrated in the pump module operates very imprecisely so that only extreme degradations can be detected. That is why an external monitoring device consisting of a tap coupler and a photodiode is sometimes used instead of the internal back facet monitor diode. The advantage of this design is that degradation of the fiber-chip coupling will be detected alongside any degradation in the chip itself. However, as manufacturing costs are disadvantageously increased by this solution it is used only for high-performance applications.

Modern amplifiers preferably employ 980-nm pumps whose chips no longer allow a decline in performance to be detected prior to a total outage and whose reliability has been substantially improved. There having on the other hand been an increase in the number of passive components used, it is becoming ever more important for monitoring to include all components affecting transmission quality.

The aim in the following is accordingly to detect aging effects in all an optical fiber amplifier's components that affect the system's transmission quality in a manner requiring minimal effort and expenditure.

Said object is achieved by the claims.

Advantageous developments of the invention are indicated in the dependent claims.

The idea central to the method described in the following is to use the measured input and output powers of an optical amplifier's amplifier stage to calculate the pump power theoretically required under the conditions prevailing at the beginning of life or, as the case may be, the corresponding injection current of pumps, referred to also as pump currents, and to compare the value thus obtained with the actually prevailing pump power or, as the case may be, corresponding pump current. The differences will serve as a measure of the aging of components in the optical fiber amplifier. The method can also be applied to structures with passive components having a wavelength-dependent attenuation, and with any power distributions on the input side.

The method will advantageously extend to a multiplicity of amplifier stages, each having an amplifying fiber and to which common pump sources may be coupled, so that monitoring between the amplifier stages will still be possible in particular if there are, for example, passive components between the amplifier stages but without power-measuring means there.

Thanks to the possibility of implementing the method and realizing the monitoring device using software means in the form of, for example, a control routine in a network management system, the invention will not require the installation of additional measuring or, as the case may be, control components in the optical fiber amplifier. It is in other words a solution that can be adapted with minimal expenditure and effort to suit fiber amplifiers in current use. A hardware-based monitoring device having a physical control module requiring to be connected to measuring signals of the measuring devices already present in the optical fiber amplifier can, however, be realized and expanded to include, for example, direct display means for visually checking any aging detected in the optical fiber amplifier.

The description in general terms is of a method for detecting aging effects in components of an optical fiber amplifier in which a broadband signal is amplified by means of a pump source in conjunction with at least one amplifying fiber. Input and output powers or, as the case may be, photon flows are detected at the input of the first amplifying fiber and at the output of the last amplifying fiber. The term "detected" in this context means that said powers are either measured directly at appropriate locations by power-measuring means or are derived from other measured variables. Photon balancing from which an effective pump power of the pump source is calculated taking account of the characteristics of components of the optical amplifier is carried out for the present operating status using the known input and output powers or, as the case may be, photon flows.

Conclusions can be drawn about the aging of components in the optical fiber amplifier depending on the nature of the difference between the pump powers or, as the case may be, currents that have been set (by a regulating means, for instance) and those theoretically calculated.

An exemplary embodiment of the invention is explained in more detail below with the aid of the drawing.

DETAILED DESCRIPTION OF THE INVENTION

Figure 1:
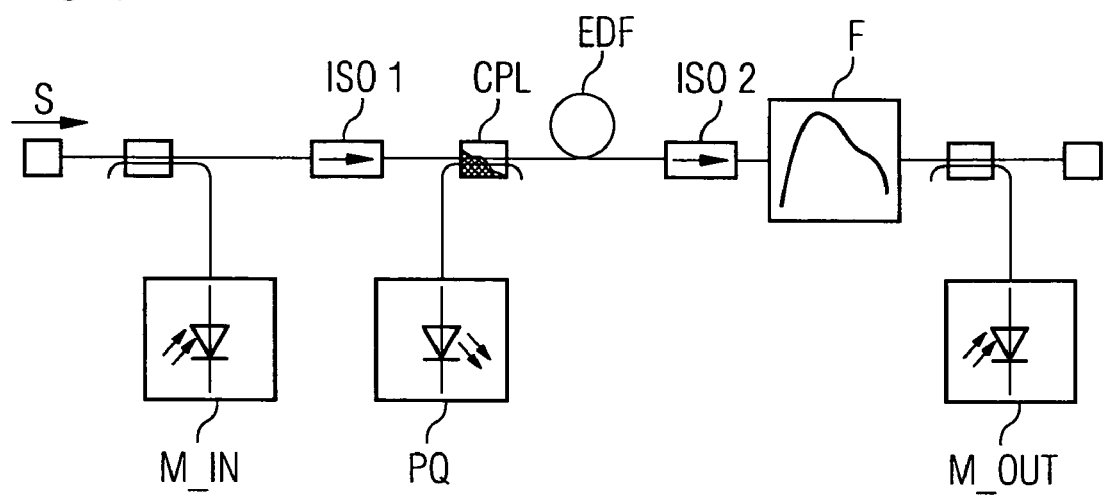
FIG. 1: shows the typical structure of an amplifier stage for a two-stage fiber amplifier.
Figure 2:
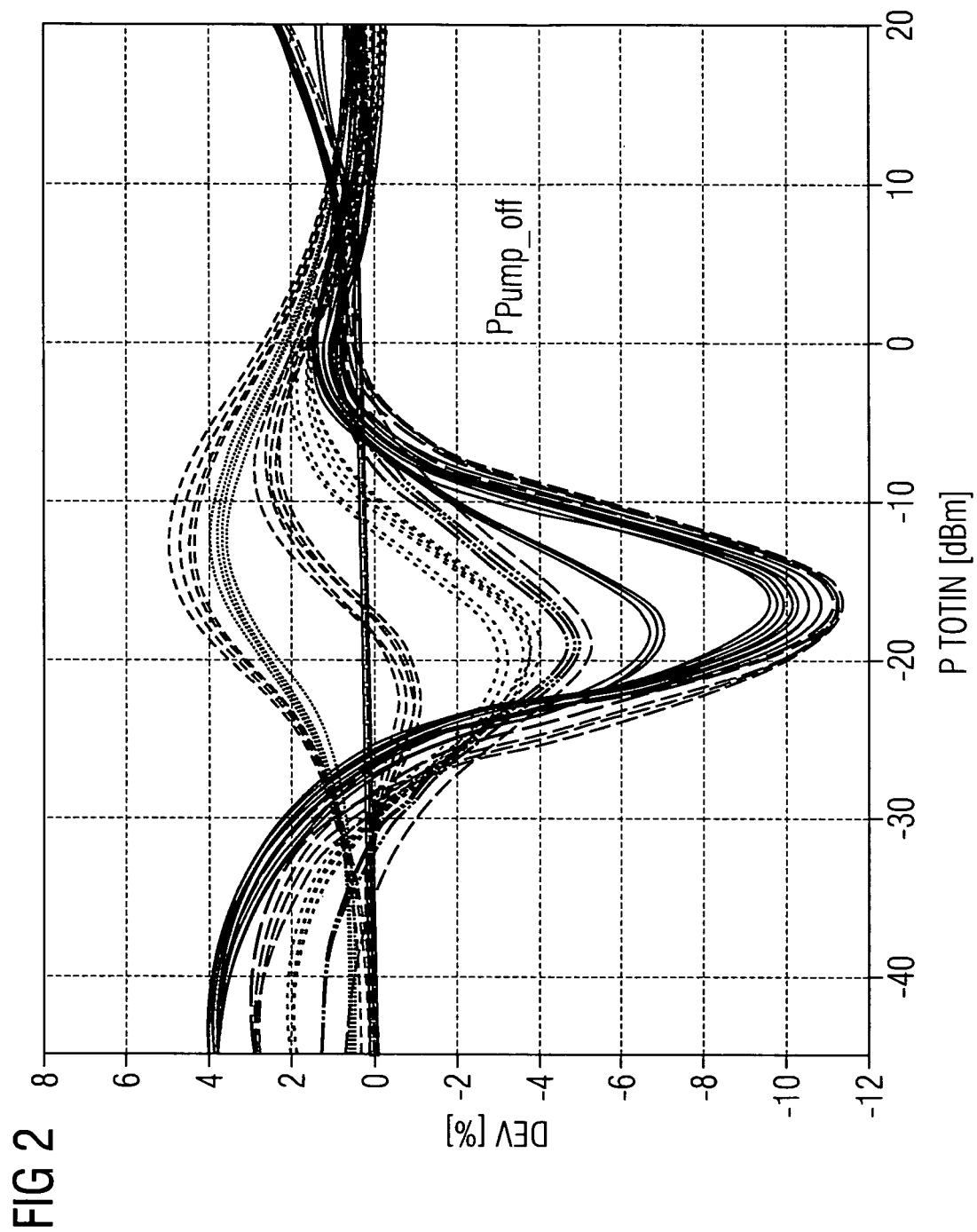
FIG. 2: shows as a function of the input power in the optical fiber amplifier according to FIG. 1 the error occurring when the theoretically required pump power is calculated.

FIG. 2 shows as a function of the total input power in conventional single-stage optical fiber amplifiers according to FIG. 1 the error occurring when the theoretically required pump power is calculated.

To better understand the simulated results shown in FIG. 2 a detailed explanation will first be given of the measures needed to achieve the object of the invention.

A major factor is to correctly model the wavelength dependency of the gain profile $G1(\lambda)$ of the erbium-doped fiber EDF. The following approach $$G1(\lambda)=[-\alpha(\lambda)+\beta(\lambda)\cdot X]$$

is selected for this, where $\alpha$ and $\beta$ are two characteristic wavelength-dependent parameters which can be determined by a person skilled in the art using known measuring methods and are directly dependent on the effective cross-sections for emission and absorption, which is to say by which an effect of spectral emission and dispersion is taken into account. The variable X is by contrast an unknown quantity that has to be continuously determined during the course of operation. Also assumed to be known is a wavelength-independent attenuation $a_{in}$ at the signal input of the erbium-doped fiber EDF and a wavelength-dependent attenuation $a_{out}(\lambda)$ at the signal output of the erbium-doped fiber EDF1 up to the output of the stage whose wavelength dependency can be determined by, inter alia, the gain-smoothing filter.

It is further assumed that a spectral power distribution $S_{in}(\lambda)$ at the input of the fiber amplifier is known either from measurements or based on an estimation. The power distribution $S_{out}(\lambda)$ at the output of the fiber amplifier's amplifier stage can hence be calculated mathematically as follows:

$$S_{out}(\lambda)=S_{in}(\lambda)\cdot a_{in}\cdot Gi(\lambda)\cdot a_{out}(\lambda)=S_{in}(\lambda)\cdot a_{in}\cdot a_{out}(\lambda)\cdot \exp[-\alpha(\lambda)+\beta(\lambda)\cdot X].$$

The value of the unknown quantity X is then determined in a following step with the aid of one of the known numerical methods in such a way that the total output power $P_{out}$ resulting within a signal band of the WDM signal S from this calculation will correspond to the total power measured at the output of the fiber amplifier. This numerical way of determining is non-critical in terms of method convergence since the total power $P_{out}$ of the power distribution $S_{out}(\lambda)$ at the output of the fiber amplifier increases monotonically with the value of the unknown quantity X. The total powers $P_{in}$, $P_{out}$ of the power distributions $S_{in}(\lambda)$, $S_{out}(\lambda)$ at the input and output of the fiber amplifier are here measured using the power-measuring means M_IN, M_OUT.

The variable X can then, according to a Saleh model[1], be considered as the result of a photon balance, which is to say as the difference in the number of coupled and exiting photons between the input and output of the erbium-doped fiber EDF. This gives the equation $$X=(1-G_{pump})\cdot p_{pump}+p_{in}-p_{out}-p_{ASE},$$

which in turn gives the conditional equation $$p_{pump} = \frac{X - p_{in} + p_{out} + p_{ASE}}{1 - G_{pump}}$$

for the effective number of pump photons coupled into the fiber EDF.

The meaning of the variables occurring here is as follows:
The variable $p_{in}$ is the total number of photons, referred to also as photon flow, coupled into the fiber per unit of time and is calculated for N active channels of the WDM signal S according to the rule $$p_{in} = \sum_{k=1}^{N} S_{in}(\lambda_k)\cdot a_{in}\cdot \frac{\lambda_k}{h\cdot c_0}$$

where $\lambda_k$ (k=1, ..., n) stands for the wavelengths of the individual channels and Planck's action quantum h and the speed of light $C_0$ in a vacuum are included in the fraction denominator. A very good approximation of the photon flow on the input side can also be obtained from the measured total input power PTOT$_{in}$ applying the calculating rule $$p_{in} = PTOT_{in}\cdot a_{in}\cdot \frac{\bar{\lambda}_{signal}}{h\cdot c_0}$$

with the fraction numerator indicating the mean wavelength $\lambda_{signal}$ of the connected channels in a vacuum. The variable $p_{out}$ is the total number of photons exiting the fiber, expressed mathematically as $$p_{out} = \sum_{k=1}^{N} S_{in}(\lambda_k)\cdot a_{in}\cdot \frac{\lambda_k}{h\cdot c_0}\cdot \exp[-\alpha(\lambda_k)+\beta(\lambda_k)\cdot X].$$

The pump light gain $G_{pump}(\lambda_{pump})$ is $$G\,pump(\lambda_{pump})=[-\alpha(\lambda_{pump})+\beta(\lambda_{pump})\cdot X],$$

with the pump light wavelength being expressed by $\lambda_{pump}$.

To achieve adequate accuracy even when powers at the input of the amplifier stage are low, as an expansion of Saleh's model[1] a further term $p_{ASE}$ has been introduced in the photon balance as an ASE power of an occurring amplified spontaneous emission ASE which term takes account of the ASE photons exiting the doped fiber at the input and output side owing to the amplified spontaneous emission. Suitable equipment not having been provided, the amplified spontaneous emission ASE cannot be measured using the structure presented according to FIG. 1. Said emission can, however, be taken into account by approximation by not coupling signal light into the fiber when the module is calibrated and registering the ASE power $p_{ASE}$ as a function of the variable X. Although, strictly speaking, the generated ASE power depends not only on the variable X, which is proportional to the mean inversion in the amplifying fiber, but, to be precise, also on the curve of the inversion along the fiber axis, this dependency can be ignored in this connection since this term is of significance only in the case of low input powers.

Characteristic parameters have to be determined both for regulating the powers and for the above described monitoring device as part of associated calibrating when an amplifier card having the fiber amplifier has been finished. The ASE power can be ascertained by varying the pump power in the presence of very low or vanishing input light so that different values are produced for the variable X. When the actual pump power at the beginning of life is known precisely the variable X can be calculated indirectly from the balance equation or, as the case may be, stored in a table so that it will not be necessary to measure the ASE power.

The pump power $P_{pump\_eff}$ requiring to be coupled into the amplifying fiber is obtained directly by multiplying the photon flow $p_{pump}$ exiting the pump source by the energy of a single pump photon. The above approach not having allowed for non-linear effects such as excited state absorption of the pump light, this will only represent an effective pump power, however. It can, though, be taken into account subsequently through a corrective calculation as follows:

$$P_{pump\_korr} = P_0 \cdot \left[\exp\left\{\frac{P_{pump\_eff}}{P_0}\right\} - 1\right]$$

where $P_{pump\_korr}$ is the corrected effective pump power and P0 is a characteristic power for the amplifying fiber used. The power $P_{pump}$ actually to be produced by the pump is obtained therefrom by multiplying by the losses in the pump path.

Because a back facet monitor diode MD can only make a very imprecise measurement of the pump power $P_{pump}$ produced by the pump source PQ, a comparison between the theoretically required value and the actual value based on pump currents must be given preference over to a comparison based on powers.

Pump diodes are gauged prior to delivery. Documenting the output power as a function of the pump current is the standard approach. This curve, again naturally only under the conditions prevailing at the beginning of life (BOL), can therefore be assumed to be known. The pump current required under BOL conditions for the specific operating state in question can thus be calculated proceeding from the calculated pump power $P_{pump}$ required for BOL conditions and compared with the measured value.

The following error mechanisms are covered by the above described method:

Reduced pump module efficiency: Any mechanisms reducing efficiency in terms of pump power will result in increased current when the pump current is calculated and be detected with a high degree of sensitivity. This means to say that a reduction in pump source efficiency will be identified if the current pump current is greater than the effective pump current.

Increased losses in the pump path: Increased attenuation in the pump path will result in a linear increase in the requisite pump power and consequently likewise be detected with a high degree of sensitivity. This means to say that a loss in the pump path, for example between the pump source and amplifying fiber, will be identified if there is a linear increase in the current pump power over the effective pump power.

Increased losses at the amplifier output: The output power of an erbium-doped fiber depends in saturated operation principally on the pump power. An increase in attenuation at the output will result in the need to set increased power at the end of the erbium-doped fiber in order to achieve the specified output power. Said increase will be transposed almost linearly to the requisite pump power and can thus likewise be detected with a high degree of sensitivity. This means to say that increased loss at an amplifying fiber's output will result in an increase in the pump power needed and hence to a greater difference between the measured reference value and that calculated for BOL conditions (pump power/pump current).

Increased losses at the amplifier input: This error mechanism is critical as it has only a slight impact on increased pump power and hence only substantial increases in attenuation can be detected. It is an error that can nevertheless be detected if there is a spectrally resolving power meter at the amplifier output since the optical fiber amplifier will react thereto with gain spectrum tilting.

These aspects of the method having been explained, FIG. 2 will now be described in more detail.

To verify the method the total power $PTOT_{out}$ resulting at the amplifier's output was determined for various operating statuses and eight different fixed pump powers 10, 20, 50, 100, 150, 200, 250, 300 mW using simulation, with the power set at the input of the amplifier stage being varied for each channel between −45 dBm and 0 dBm and the number of channels being varied between 1 and 80. Account was therefore taken of a very large number of possible operating statuses. All relevant effects in the erbium-doped fiber having been taken into account using the simulation tool employed for the purpose, this procedure is virtually equivalent to determining the output power experimentally.

With the aid of the above described method the requisite pump power $P_{pump\_eff}$ was then calculated for each of said operating statuses according to the above described method. The result for the pump power should ideally be the value set during simulation as no aging has taken place. Certain approximations will, however, in the present model result in differences between the actual pump powers and the power values calculated with the aid of the method that are shown in FIG. 2 as a function of the total input power $PTOT_{in}$ (in dBm). The superimposed curves link the results from operating points having identical pump power and the same number of channels.

As can be seen from FIG. 2, the relative difference DEV is less than 11% over the entire total power range under consideration at the input of the amplifier stage. The relative difference DEV is even at most 5% for input powers $PTOT_{in}$ exceeding −10 dBm. Furthermore, the difference is remarkably small in the case of very high and very low input powers. At typical operating points the error DEV in the monitoring method is thus less than 5%.

To achieve the best possible accuracy in calculating the pump power the input power spectrum at the optical fiber amplifier's input should be known. Said spectrum can be determined very precisely if there is a spectrally resolving power meter at the output of the preceding amplifier unit. The output spectrum at the preceding amplifier unit's output will consequently be able to [lacuna] on which the calculations for the following amplifier stages (as in FIG. 1) will then build. In the absence of data about a preceding spectral power distribution the same power is to be assumed at the input for each active channel (let it be assumed that the channel assignment is known via the Optical Supervisory Channel (OSC)), for example, with that value being selected so as to give the measured total input power.

If a fiber amplifier consists of a plurality of stages having possibilities for determining the power at their input and output, then said method can be applied separately to each stage. Additional difficulties will, however, arise when two or more stages share pumps and no power data is available. A solution for such an eventuality is described below.

Figure 3:
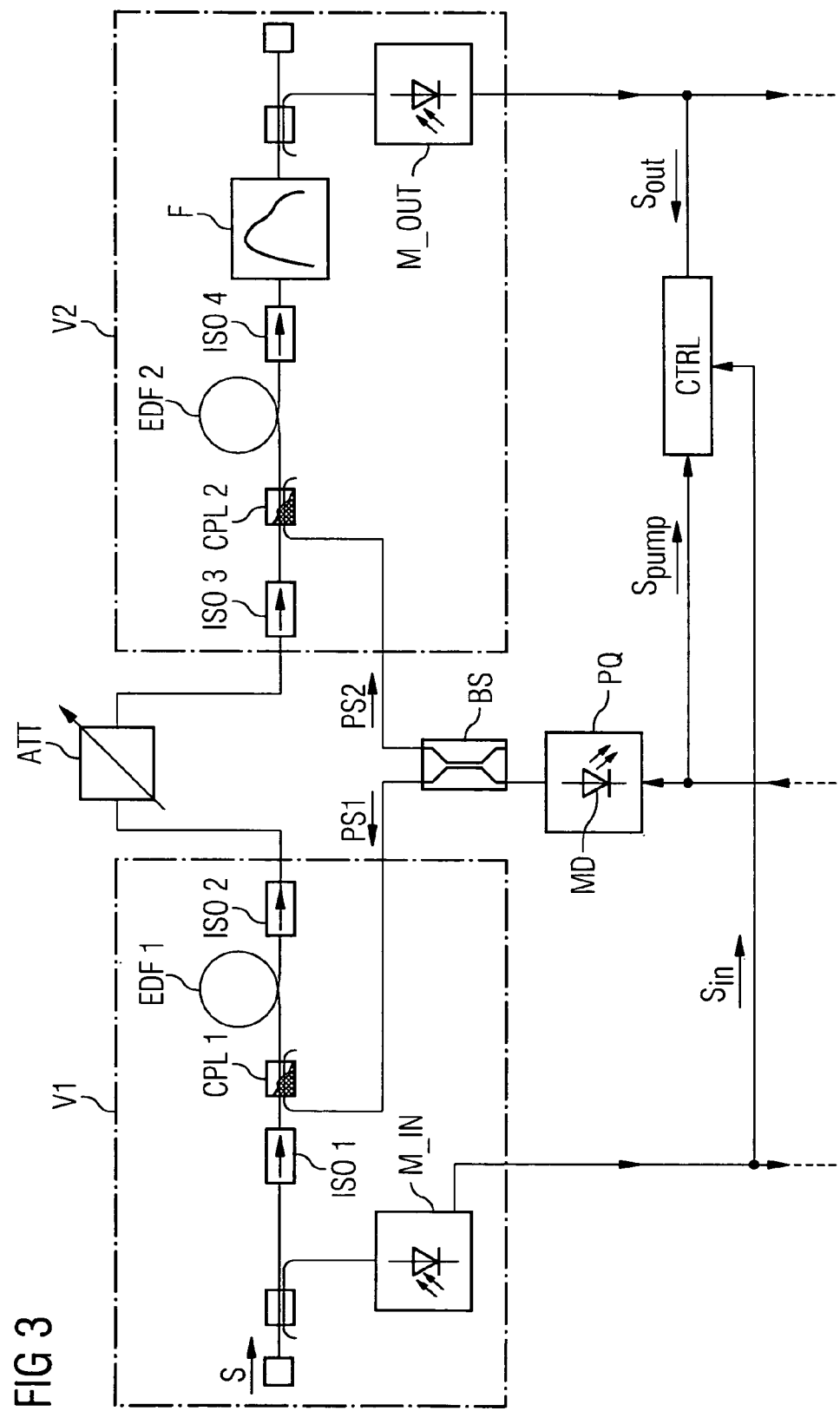
FIG. 3: shows an arrangement for applying the method according to the invention having two amplifier stages.

FIG. 3 shows an expansion of FIG. 1 where the invention has been adapted to a two-stage optical fiber amplifier instead of the single-stage fiber amplifier shown in FIG. 1. The special feature of this fiber amplifier is that the two stages share a single pump. Proceeding from FIG. 1, in FIG. 3 two amplifier stages V1, V2 are connected in series with a variable attenuator ATT. According to FIG. 1 the first amplifier stage V1 has input power measuring means M_IN, a connection to the pump source PQ by means of a first pump signal PS1 entering the first amplifying fiber EDF1 via a first coupler CPL1, and the two isolators ISO1, ISO2. The filter F according to FIG. 1 has here been replaced by the attenuator ATT which, as a passive component of the overall fiber amplifier V1+V2, enables the signal S yet to be amplified to be transferred to the second amplifier stage V2. In contrast to FIG. 1 the amplifier stage V2 in FIG. 3 has no input power measuring means M_IN but does have output power measuring means M_OUT, a connection to the pump source PQ by means of a second pump signal PS2 entering the a second amplifying fiber EDF2 via a second coupler CPL2, two isolators ISO3, ISO4, and the smoothing filter F connected upstream of the output power measuring means M_OUT. The amplifying fibers EDF1, EDF2 are both of the same type and are pumped by means of a single photodiode radiation of the pump source PQ. To produce the two pump signals PS1, PS2 a beam splitter BS is connected intermediately between the output pump source PQ and the input of the respective coupler CPL1, CPL2. Attention is drawn here to there being no power meter between the two amplifier stages V1, V2 and to its nonetheless being possible to perform quality monitoring.

The idea central to the method described in the following is to use the input and output powers measured at the input of the first amplifier stage V1 and at the output of the second amplifier stage V2 to calculate the pump power (theoretically) required under the conditions prevailing at the beginning of life or, as the case may be, the corresponding injection current of the pump source PQ for generating the pump signals PS1, PS2 and to compare the value thus obtained with the actually prevailing pump current. The differences will serve as a measure of the aging of the components in the optical fiber amplifier. The method can also be applied to structures with passive components having a wavelength-dependent attenuation, and with any power distributions on the input side.

The variable X representing a photon balance by means of photon flows $p_{in}$, $p_{out}$, $p_{pump}$ is determined in a first step analogously to the method described for the single-stage fiber amplifier already mentioned. In the present case said photon balance now extends, however, to the two coupled amplifier stages V1, V2. The known attenuation of the attenuator ATT is treated here exactly like the passive losses already cited. It is a major prerequisite for erbium-doped fibers of the same type to be used in both stages.

The pump power $P_{pump}$ is distributed between the two amplifier stages V1, V2 according to a fixed ratio. The following equation is thus obtained in terms of photon flows $p_{in}$, $p_{out}$, $p_{pump}$ $$X = (1 - G_{pump}) \cdot p_{pump} + p_{in} - p_{out} + p_{in} \cdot G_1 \cdot (a-1),$$

where a stands for the transmission of the passive components including the attenuator ATT between the two stages V1, V2 and G1 is the estimated mean gain of the first amplifier stage V1. The contribution made by the amplified spontaneous emission ASE has been ignored in this equation to make the object of the invention easier to understand. The effective pump power $P_{pump\_eff}$ can thus be derived from the corresponding photon flow $p_{pump}$ as follows:

$$p_{pump} = \frac{X - p_{in} + p_{out} - p_{in} \cdot G_1 \cdot (a-1)}{1 - G_{pump}}.$$

The difficulty with monitoring two amplifier stages that share a single pump arises from not knowing the value of the gain $G_1$ representing the mean gain of the first amplifier stage V1. The other variables have already been defined in the report of invention already mentioned.

The mean gain of the first amplifier stage V1 can, however, be determined iteratively by applying one of the methods for modeling a stage of an erbium-doped fiber amplifier that are described in [2] and, for the pump power, using an estimation the value of which is derived from the laser diode current or monitor diode signal. An improved estimation is then calculated for the pump power using the above given formulas. The variable $G_1$ is in turn estimated using this new value and the result will then produce an improved estimation for the pump power. This method can then continue being iterated until a specified convergence criterion has been met.

The photon flows, for example $p_{in}$, must finally be converted into powers, for example $P_{in}$, and, if applicable, the effect of the pump light's excited state absorption taken into account using corrective calculating. Further steps will then correspond to those applying to a single amplifier stage.

Where the technical equipment is concerned, to implement the method already described it is possible to connect a monitoring device of an optical fiber amplifier for broadband signals S to the optical fiber amplifier having at least one amplifying fiber EDF1, EDF2, . . . , EDFn in conjunction with at least one pump source PQ, wherein power-measuring means M_IN, M_OUT are connected at least at the input of the first amplifying fiber EDF1 and at the output of the last amplifying fiber EDFn.

As mentioned already, the monitoring device can also be realized completely using software means instead of hardware components. The monitoring device could in that case be implemented as a control routine in the network management system, with the measuring signals (such as from the power-measuring means M_IN, M_OUT) already present in the optical fiber amplifier then serving as the software's input parameters. The control routine could, when aging effects have been detected, in turn issue a warning signal directly on a software basis on a computer's monitor or by means of adapted display means such as photodiodes or acoustic signal generators.

Output signals $S_{in}$, $S_{out}$ of the power-measuring means M_IN, M_OUT and an evaluation signal $S_{pump}$ of the current pump power $P_{pump}$, where applicable of the current pump current, are routed to inputs of a control module CTRL. The software-based or hardware-based control module CTRL has a computer for determining a theoretical pump power $P_{pump\_eff}$, where applicable of an effective pump current, using characteristics of components of the optical fiber amplifier at the beginning of life. So that conclusions can be drawn about the aging of components of the optical fiber amplifier the control module CTRL has a decision unit whose main input parameters are the current and effective pump powers $P_{pump}$, $P_{pump\_eff}$, where applicable of their pump currents. Display means, for example for visually displaying the aging status of components, can be connected downstream of the decision unit so that an operator can clearly discern which component has aged.

It is furthermore possible in the case of a software-supported control module CTRL to use a data carrier having a program that can be loaded into the control module CTRL, with said control module CTRL implementing the inventive method when the cited program is executed. This will make it easier for a technician to perform possible expanding or updating of the software for example in the network management system and in a local portable monitoring device.

REFERENCES

[1] Saleh et al., "Modeling of gain in erbium-doped fiber amplifiers", IEEE Photonics Technology Letter, Vol. 2, pp. 714-717 (1990)

[2] E. Desurvire, D. Bayart, B. Desthieux, S. Bigo: ERBIUM-DOPED FIBER AMPLIFIERS, Device and System Developments, John Wiley, New York, 2002, pp. 11-61.

The invention claimed is:

1. A method for detecting aging effects in components of an optical fiber amplifier, wherein a broadband signal is amplified by a pump source using at least one amplifying fiber, the method comprising:
   determining an input power at the input of the amplifying fiber;
   determining an output power at the output of the amplifying fiber;
   calculating a theoretically required pump power of the pump source based on characteristics of at least one component of the optical amplifier relative to a beginning of its component life, the theoretically required pump power including a photon balance based on the input and output powers or photon flows related to the input and output powers at a current pump power of the pump source;
   determining aging information related to the component of the optical fiber amplifier based on a difference between the current and the theoretically required pump powers; and
   generating a signal indicative of the determined aging information related to the component of the optical fiber amplifier.

2. The method according to claim 1, wherein the theoretically required pump power or a corresponding pump current related to The theoretically required pump power is calculated based on calibration data.

3. The method according to claim 1, wherein a wavelength-dependent gain profile $G(\lambda)$ is modeled for an amplifier stage including the amplifying fiber using the formula $$G(\lambda) = [-\alpha(\lambda) + \beta(\lambda) \cdot X]$$

with ($\alpha(\lambda)$, $\beta(\lambda)$) being measured wavelength-dependent parameters including an effect of spectral emission and absorption and with the variable X being a difference between a number of photons entering the amplifier fiber and a number of photons leaving the amplifier fiber.

4. The method according to claim 3, wherein in the case of a single amplifier stage the variable X is calculated using the equation $$X = (1 - G_{pump}) \cdot P_{pump} + P_{in} - P_{out} - P_{ASE}$$

with ($P_{in}$, $P_{out}$, $P_{pump}$) input photon flows, output photon flows, pump photon flows, and ($P_{ASE}$) signifying a portion of photon flow of amplified spontaneous emission, and with ($G_{pump}$) being defined as follows in the case of a pump wavelength of ($\lambda_{pump}$):

$$G_{pump}(\lambda_{pump}) = [-\alpha(\lambda_{pump}) + \beta(\lambda_{pump}) \cdot X].$$

5. The method according to claim 3, wherein in the case of a two-stage—fiber amplifier the variable X is calculated using the equation $$X = (1 - G_{pump}) \cdot P_{pump} + P_{in} - P_{out} + P_{in} \cdot G_1 \cdot (a - 1)$$

with ($P_{in}$, $P_{out}$, $P_{pump}$, a, $G_1$) input photon flows, output photon flows, and pump photon flows signifying a transmissions coefficient., such as an attenuation, between the two amplifier stages and an iteratively determined mean gain value of the flit amplifier stage, and with a pump gain ($G_{pump}$) being defined as follows in the case of a pump wavelength of ($\lambda_{pump}$):

$$G_{pump}(\lambda_{pump}) = [-\alpha(\lambda_{pump}) + \beta(\lambda_{pump}) \cdot X].$$

6. The method according to claim 5, wherein the two amplifier stages are serially connected, each containing the same amplifier fiber, and wherein the pump power of ' the pump source is distributed between the two amplifier stages.

7. The method according to claim 3, wherein the variable X is determined in such a way that the total power occurring, based on mathematical calculations, within a signal band of the WDM signal at the output ' of the fiber amplifier will correspond to the measured power and the pump power theoretically required at the beginning of life is determined therefrom.

8. The method according to claim 7, wherein the spectral power distribution ($S_{in}(\lambda)$) is measured at the input of the amplifying fiber, and wherein a spectral power distribution ($S_{out}(\lambda)$) at the output of the amplifier fiber is calculated as in the following equation:

$$S_{out}(\lambda) = S_{in}(\lambda) \cdot a_{in} \cdot G_i(\lambda) \cdot a_{out}(\lambda) = S_{in}(\lambda) \cdot a_{in} \cdot a_{out}(\lambda) \cdot \exp[-\alpha(\lambda) + \beta(\lambda) \cdot X]$$

with ($a_{in}$, $a_{out}(\lambda)$) being one of a known wavelength-independent and wavelength-dependent attenuation at the input and at the output of an amplifying fiber.

9. The method according to claim 3, wherein the gain of individual stages of the fiber amplifier is modeled with the aid of characteristic fiber data based on knowing the variable X.

10. The method according to claim 1, wherein the calculating of the theoretically required pump power of the pump source at the beginning of the component life is based at least on a variable indicative of photon balance.

11. The method according to claim 1, wherein the pump power of an individual pump source is distributed among several successive amplifying fibers between which signal powers are measured or derived.

12. The method according to claim 1, wherein for identifying a reduction in pump source efficiency the current pump current exceeds the effective pump current.

13. The method according to claim 1, wherein for identifying a loss in the pump path, between the pump source and amplifying fiber, there is a linear increase in the current pump power over the effective pump power.

14. The method according to claim 1, wherein for identifying a loss at the output of an amplifying fiber, due possibly to increased attenuation at the output of the amplifying fiber, there is a linear increase in the current pump power there over the effective pump power.

15. The method according to claim 1, wherein for identifying a loss at the input of an amplifying fiber there is a slight increase in the current pump power there over the effective pump power, and wherein a measurement of the tilt in the power spectrum of the signal there is employed as a further aid.

16. The method according to claim 1, wherein the method is performed by a computer program stored on a data carrier and loadable into a control module.

17. The method according to claim 1, wherein the optical fiber amplifier includes at least two serially connected amplifier stages with each stage having the amplifier, fiber, and wherein the current pump power is distributed among the at least two amplifier stages.

18. A method for detecting aging effects in components of an optical fiber amplifier wherein a broadband signal is amplified by means of a pump source in conjunction with at least one amplifying fiber, the method comprising:
  determining input and output powers at the input of a first amplifying fiber and at the output of a last amplifying fiber;
  calculating a theoretically required pump power of the pump source taking account of the characteristics of components of the optical amplifier at the beginning of life, the calculating comprising photon balancing based on one of the input and output powers and photon flows, and, in the case of a current pump power, the pump source;
  determining aging information related to a component of the optical fiber amplifier based on the nature of differences between the current and theoretically required pump powers; and
  generating a signal indicative of the determined aging information related to the component of the optical fiber amplifier.

19. A monitoring device of an optical fiber amplifier for broadband signals, which amplifier has at least one amplifying fiber in association with a pump source, wherein power-measuring means are connected at the input of a first amplifying fiber and at the output of a last amplifying fiber, wherein
  output signals of the power-measuring means and an evaluation signal of the current pump power are routed to inputs of a control module, and wherein
  the control module has a computer for calculating a theoretically required pump power of the pump source taking account of the characteristics of components of the optical amplifier at the beginning of life, the calculating comprising photon balancing based on one of the input and output powers and photon flows, and, in the case of a current pump power, the pump source, wherein the control module further determines aging information related to a component of the optical fiber amplifier based on the nature of differences between the current and theoretically required pump powers; and
  a decision unit coupled to the control module, the decision unit configured to generate a signal indicative of the aging of the component of the optical fiber amplifier, the decision unit responsive to the current and effective pump powers or their respective pump currents.

20. The monitoring device according to claim 19, wherein the evaluation signal of the current pump power is a current pump current.

21. The monitoring device according to claim 19, wherein the control module is a software-based platform controlled by a network management system, the software-based platform configured to generate an error message related to the aging of components.

22. The monitoring device according to claim 19, wherein the control module is provided at least as a part of a portable monitoring unit.

23. The monitoring device according to claim 19, wherein means for displaying the aging status of components are arranged downstream of the decision unit.

* * * * *